US010817991B2

(12) United States Patent
Reddy

(10) Patent No.: US 10,817,991 B2
(45) Date of Patent: Oct. 27, 2020

(54) METHODS FOR DEEP-LEARNING BASED SUPER-RESOLUTION USING HIGH-FREQUENCY LOSS

(71) Applicant: ADVANCED NEW TECHNOLOGIES CO., LTD., George Town (KY)

(72) Inventor: Sai Narsi Reddy Donthi Reddy, Kansas City, MO (US)

(73) Assignee: ADVANCED NEW TECHNOLOGIES CO., LTD., George Town, Grand Cayman (KY)

( * ) Notice: Subject to any disclaimer, the term of this patent is extended or adjusted under 35 U.S.C. 154(b) by 62 days.

(21) Appl. No.: 16/247,450

(22) Filed: Jan. 14, 2019

(65) Prior Publication Data

US 2020/0226718 A1  Jul. 16, 2020

(51) Int. Cl.
*G06T 3/40* (2006.01)
*G06T 7/40* (2017.01)
(Continued)

(52) U.S. Cl.
CPC .......... *G06T 3/4053* (2013.01); *G06T 3/4046* (2013.01); *G06T 5/002* (2013.01);
(Continued)

(58) Field of Classification Search
CPC .. G06T 7/40; G06T 5/002; G06T 5/50; G06T 5/003; G06T 2207/20084; G06T 2207/20081; G06T 2207/20182
See application file for complete search history.

(56) References Cited

U.S. PATENT DOCUMENTS

2017/0193635 A1* 7/2017 Zhao .................... G06T 5/50
2019/0114742 A1* 4/2019 Wang .................. G06T 5/002
(Continued)

FOREIGN PATENT DOCUMENTS

CN  107492070  * 12/2017

OTHER PUBLICATIONS

Wang et al. "Semi-coupled dictionary learning with applications to image super-resolution and photo-sketch synthesis", 2012 IEEE Conference on Computer Vision and Pattern Recognition (Year: 2012).*

(Continued)

*Primary Examiner* — Qian Yang
(74) *Attorney, Agent, or Firm* — Fish & Richardson P.C.

(57) ABSTRACT

A machine learning model can be trained to perform super-resolution by using high-frequency loss. One or more degradations of a first type can be applied to reference images to generate corresponding degraded images that include a reduced amount of high-frequency texture information when compared to the corresponding reference images. A mapping function associated with a machine learning process can used to generate predicted images. One or more degradations of a second type can be applied to the predicted images and the reference images to generate corresponding low-frequency images. The low frequency images corresponding to the predicted images can be compared to the low-frequency images corresponding to the reference images. Based at least partially on the comparison, a loss value can be calculated. If the loss value exceeds a loss value threshold, the mapping function can be updated in accordance with the loss value.

20 Claims, 4 Drawing Sheets

(51) Int. Cl.
*G06T 5/00* (2006.01)
*G06T 5/50* (2006.01)

(52) U.S. Cl.
CPC .............. *G06T 5/003* (2013.01); *G06T 5/50* (2013.01); *G06T 7/40* (2013.01); *G06T 2207/20081* (2013.01); *G06T 2207/20084* (2013.01); *G06T 2207/20182* (2013.01)

(56) References Cited

U.S. PATENT DOCUMENTS

2019/0355103 A1* 11/2019 Baek ................ G06K 9/6256
2019/0378242 A1* 12/2019 Zhang ............... G06T 3/4061

OTHER PUBLICATIONS

Zhao et al. "High Resolution Local Structure-Constrained Image Upsampling", IEEE Transactions on Image Processing, vol. 24, No. 11, Nov. 2015 (Year: 2015).*
Machine translation for CN 107492070 (Year: 2017).*
Gao et al, "On-Demand Learning for Deep Image Restoration," IEEE International Conference on Computer Vision and Pattern Recognition, Oct. 2017, 1086-1095.

* cited by examiner

METHODS FOR DEEP-LEARNING BASED SUPER-RESOLUTION USING HIGH-FREQUENCY LOSS

FIELD OF THE INVENTION

This disclosure generally relates training a machine learning model to perform super-resolution techniques. In particular, this disclosure relates to training a machine learning model to account for high-frequency loss.

BACKGROUND

Machine learning models, such as those that use artificial neural networks, can be trained to perform super-resolution techniques, which generally refers to predicting a high-resolution image from a low-resolution version. These techniques typically involve using one or more image reconstruction processes. For example, neural networks can be trained to perform denoising and/or deblurring processes to predict a high-resolution image from a low-resolution version.

SUMMARY

In at least one aspect of the present disclosure a method is provided. The method includes obtaining a plurality of reference images each of which includes high-frequency texture information and low-frequency texture information and applying one or more degradations of a first type on the reference images to generate corresponding degraded images, the degraded images including a reduced amount of high-frequency texture information as compared to the corresponding reference images. The method includes generating, from at least a subset of the degraded images, corresponding predicted images using a mapping function associated with a machine learning process to at least partially remove the one or more first degradations and applying one or more degradations of a second type to each of the predicted images to generate corresponding low-frequency predicted images, the low-frequency predicted images including a reduced amount of high-frequency texture information as compared to the corresponding predicted images. The method includes applying the one or more degradations of the second type to each of the reference images to generate corresponding low-frequency reference images, the low-frequency reference images including a reduced amount of high-frequency texture information as compared to the corresponding reference images. The method includes pixel-wise subtracting each of the degraded-predicted images from the corresponding predicted images to generate a first set of images and pixel-wise subtracting each of the low-frequency reference images from the corresponding reference image to generate a second set of images. The method includes computing, based on the first and second set of images, a loss value associated with the machine learning process and determining that the loss value satisfies a threshold condition. The method includes, responsive to determining that the loss value satisfies a threshold condition, updating the mapping function.

The method can further include computing, based on the predicted images and corresponding reference images, a pixel-loss value associated with the machine learning process, and wherein computing the loss value associated with the machine learning process is also based on the pixel-loss value. The one or more degradations of the first type can include at least one of noise, blur, or resolution downscaling. The one or more second degradations can include a Gaussian blur. At least a portion of the plurality of reference images can include one or more ocular features. The mapping function can be configured to restore high-frequency texture information. Updating the mapping function can include adjusting one or more parameters of the mapping function to reduce the loss value. Computing the loss value can include performing a pixel-wise subtraction between each image in the first set of images and a corresponding image in the second set of images. The first set of images and the second set of images can include high-frequency texture information. A degradation of the first type can be substantially same as a degradation of the second type.

In at least one other aspect of the present disclosure, a system is provided. The system includes a computer-readable memory comprising computer-executable instructions; and at least one processor executing executable logic including at least one machine learning module trained to resolve an image. When the at least one processor is executing the computer-executable instructions, the at least one processor carries out operations to: obtain a plurality of reference images each of which includes high-frequency texture information and low-frequency texture information; apply one or more degradations of a first type on the reference images to generate corresponding degraded images, the degraded images including a reduced amount of high-frequency texture information as compared to the corresponding reference images; generate, from at least a subset of the degraded images, corresponding predicted images using a mapping function associated with a machine learning process to at least partially remove the one or more first degradations; apply one or more degradations of a second type to each of the predicted images to generate corresponding low-frequency predicted images, the low-frequency predicted images including a reduced amount of high-frequency texture information as compared to the corresponding predicted images; apply the one or more degradations of the second type to each of the reference images to generate corresponding low-frequency reference images, the low-frequency reference images including a reduced amount of high-frequency texture information as compared to the corresponding reference images; pixel-wise subtract each of the low-frequency predicted images from the corresponding predicted images to generate a first set of images; pixel-wise subtract each of the low-frequency reference images from the corresponding reference image to generate a second set of images; compute, based on the first and second set of images, a loss value associated with the machine learning process; determine that the loss value satisfies a threshold condition; and responsive to determining that the loss value satisfies a threshold condition, update the mapping function if the loss value satisfies a threshold condition.

When the at least one processor is executing the computer-executable instructions, the at least one processor can further carry out operations to: compute, based on the predicted images and corresponding reference images, a pixel-loss value associated with the machine learning process, and wherein computing the loss value associated with the machine learning process is also based on the pixel-loss value. The one or more degradations of the first type can include at least one of noise, blur, or resolution downscaling. The one or more second degradations can include a Gaussian blur.

At least a portion of the plurality of reference images can include one or more ocular features. The mapping function can be configured to restore high-frequency texture information. Updating the mapping function can include adjusting one or more parameters of the mapping function to reduce the total loss value. Computing the loss value includes performing a pixel-wise subtraction between each image in the first set of images and a corresponding image in the second set of images. The first set of images and the second set of images can include high-frequency texture information. A degradation of the first type can be substantially the same as a degradation of the second type.

In another aspect, the present disclosure features one or more machine-readable storage devices encoded with instructions configured to cause one or more processing devices to execute various operations. The operations include obtaining a plurality of reference images each of which includes high-frequency texture information and low-frequency texture information, and applying one or more degradations of a first type on the reference images to generate corresponding degraded images. The degraded images include a reduced amount of high-frequency texture information as compared to the corresponding reference images. The operations also include generating, from at least a subset of the degraded images, corresponding predicted images using a mapping function associated with a machine learning process to at least partially remove the one or more first degradations, and applying one or more degradations of a second type to each of the predicted images to generate corresponding low-frequency predicted images. The low-frequency predicted images including a reduced amount of high-frequency texture information as compared to the corresponding predicted images. The operations further include applying the one or more degradations of the second type to each of the reference images to generate corresponding low-frequency reference images, the low-frequency reference images including a reduced amount of high-frequency texture information as compared to the corresponding reference images. The operations also include pixel-wise subtracting each of the degraded-predicted images from the corresponding predicted images to generate a first set of images, pixel-wise subtracting each of the low-frequency reference images from the corresponding reference image to generate a second set of images, computing, based on the first and second set of images, a loss value associated with the machine learning process, determining that the loss value satisfies a threshold condition, and in response, updating the mapping function.

In some implementations, the technology described herein can provide one or more of the following advantages. Traditional denoising and deblurring processes typically treat high-frequency texture information, such as fine-level edge details in areas of an image where pixel intensity values tend to change drastically, as noise, and attenuates these features when reconstructing an image. By specifically accounting for high-frequency losses in super-resolution techniques, the technology described herein can better preserve high-frequency (texture) information in images, making them potentially better suited for underlying biometric authentication systems.

DETAILED DESCRIPTION

General Overview

Figure 1:
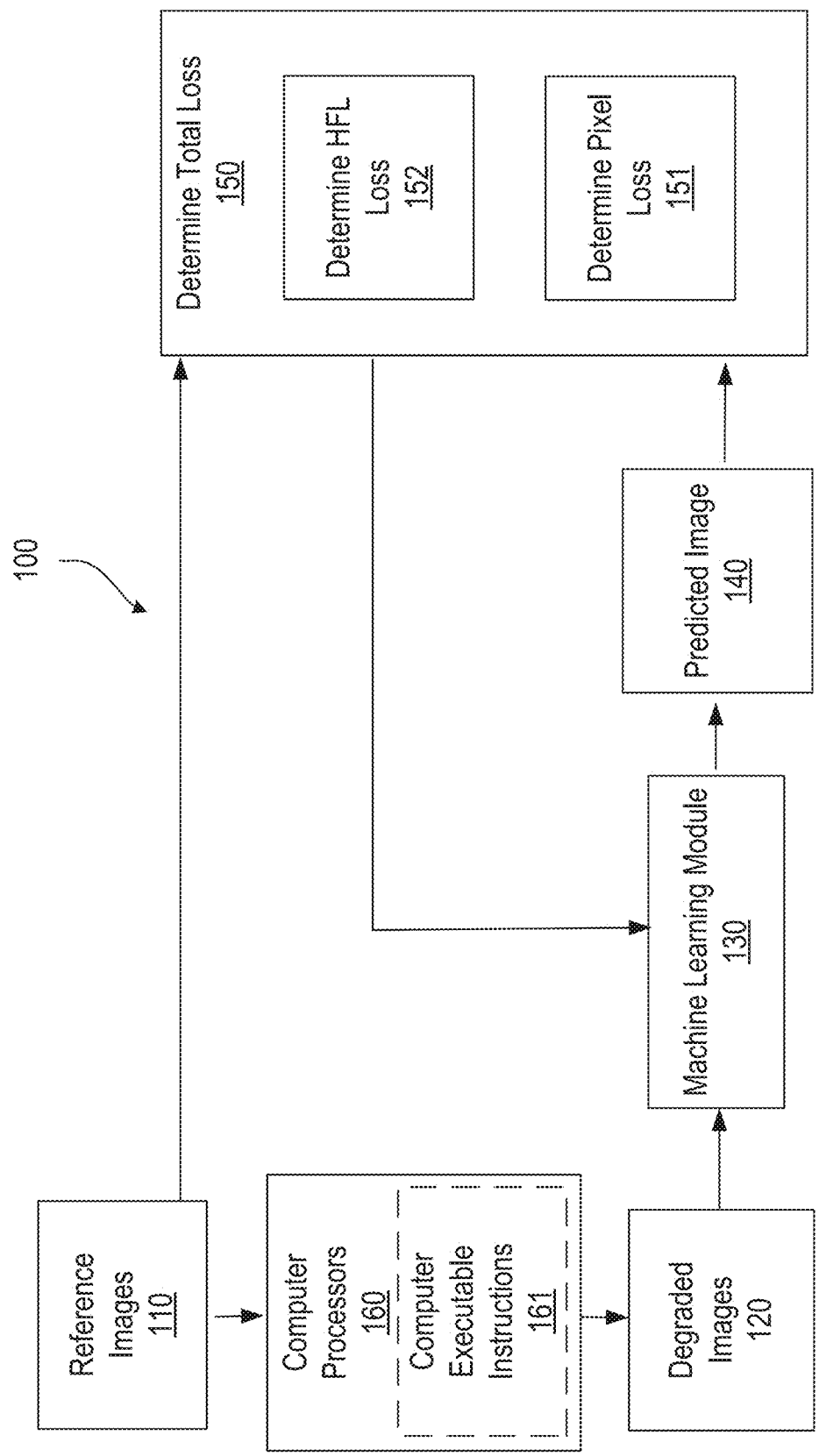
FIG. 1 shows a block diagram of an example system for implementing machine-learning based super resolution in accordance with technology described herein.

Machine learning models, such as those that use artificial neural networks, can be trained to perform super-resolution techniques, which generally refer to predicting a high-resolution image from a low-resolution version. These techniques typically involve using one or more image reconstruction processes. For example, neural networks can be trained to perform denoising and/or deblurring processes to predict a high-resolution image from a low-resolution version. Traditional denoising and deblurring processes typically treat high-frequency texture information (such as fine-level edge details in areas of an image where pixel intensity values tend to change drastically) as noise and attenuate these features when reconstructing an image.

However, in fields such as ocular-biometrics, high-frequency texture information may be important. This is because ocular-biometrics devices typically use such high-frequency texture information in and around the eye to identify a person and/or animal. However, sometimes the captured images are noisy and blurry, which can make it difficult to extract such high-frequency texture information. Thus, it may be desirable to train and design a machine learning model capable of performing super-resolution in such a manner that is capable of reconstructing the high-frequency texture information in images.

Among other things, the present disclosure provides techniques for training a machine learning model to perform super-resolution on images using high-frequency loss information. The techniques involve generating a plurality of degraded images from a plurality of reference images. The degraded images are then propagated through a machine learning model, which learns/generates one or more mapping functions to produce the reference images from the corresponding degraded images. Multiple iterations of learning/training are performed until the machine learning system is determined to be adequately accounting for high frequency losses. This can be done, for example, by generating enhanced images using a learned mapping function, and extracting high frequency information from the enhanced images using techniques described herein. High frequency information from the corresponding reference images are also extracted, and a high-frequency loss associated with the training/learning process is then calculated. In some implementations, a pixel loss for the training process is determined based on pixel intensity differences between the enhanced images and the reference images, and a total loss is calculated as a sum of the pixel loss and the high-frequency loss. The total loss is backpropagated to the machine learning model, which uses the loss information to determine whether further updates to the mapping function are to be performed (e.g., to further reduce the loss). Another iteration of the learning process is initiated accordingly. Thus, the machine learning model described herein can use high-frequency loss information to update the learning process such that the model becomes more accurate in predicting, from degraded images, high-resolution images that include texture information usable by underlying biometric authentication systems. In some implementations, these techniques have been shown to increase the accuracy of identification by three percent when used in conjunction with ocular biometric devices.

Deep-Learning Based Super Resolution Using High Frequency Loss

FIG. 1 is an illustration showing an architecture 100 for performing deep-learning based super resolution using high frequency loss. The architecture 100 includes one or more computer processors 160 (also referred to herein as processing devices) and a machine learning module 130. In some implementations, the machine learning model 130 can be implemented using the computer processors 160, or one or more additional processing devices. The computer processors 160 are configured to receive a plurality of reference images 110 and generate, for each reference image 110, a degraded image 120. The machine learning module 130 is configured to receive each of the degraded images 120 and, for each degraded image 120, generate a predicted image 140 by using one or more mapping functions. The one or more mapping functions may in turn be learned/generated by the machine learning module 130 during a previous iteration of the underlying training process using the reference images 110 and the corresponding degraded images as the training data. In some implementations, the computer processors 160 and/or the machine learning module 130 are configured to calculate a total loss value 150 by calculating a pixel loss value 151 and a high-frequency loss (HFL) function 152 for the predicted images 140 by comparing each predicted image 140 to a corresponding reference image 110. The machine learning module 130 is configured to use the total loss value 150 to update its mapping function by, for example, adjusting the mapping function to minimize the total loss value 150. Updates to the mapping function can be performed, for example, by using another iteration of the learning process based on another set of training data (e.g., a known set of reference images and corresponding degraded images generated using known degradation processes).

The reference images 110 are captured by one or more sensing devices. For example, in some implementations, the sensing device is a digital camera that uses a charged-coupled device (CCD) and/or complementary metal oxide semiconductor (CMOS) to convert photons to electrons for digital processing. The sensor can also be a light-emitting diode (LED) scanner, a laser scanner, an imaging scanner, and so forth. The reference images 110 can take the form of several image data formats, such as RAW, JPEG, PNG, and so forth. In some implementations, at least some of the reference images 110 are ocular images (e.g., still images of ocular structures such as the external eye, anterior segment, retina, etc.). In some implementations, the reference images include high-frequency texture information and low-frequency texture information. High-frequency texture information refers to portions of an image that have sharp/contrast edges that show fine details of the image. Low-frequency texture information refers to portions of an image that have smooth gradients that generally provide information about an image's general colors and tones.

The computer processors 160 can include one or more processing devices such as microprocessors, microcontrollers or digital signal processors (DSPs). In some implementations, the computer processors 160 include a general purpose processor. In some implementations, the computer processors 160 include a central processing unit (CPU). In some implementations, the computer processors 160 include at least one application specific integrated circuit (ASIC). The computer processors 160 can also include general purpose programmable microprocessors, special-purpose programmable microprocessors, digital signal processors (DSPs), programmable logic arrays (PLAs), field programmable gate arrays (FPGA), special purpose electronic circuits, etc., or a combination thereof.

In some implementations, the computer processors 160 include a computer-readable medium (or computer-readable memory), The computer-readable medium can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In some implementations, the computer-readable medium includes code-segment having executable instructions. The computer processors 160 are configured to execute program code means such as the computer-executable instructions 161.

While executing the computer-executable instructions 161, the computer processors 160 are configured to receive the reference images 110 and apply one or more image degradation effects to the reference images 110 to generate the degraded images 120. For example, in some implementations, the computer processors 160 apply noise, blur, and/or resolution downscaling to the reference images 110. Blur refers to the manipulation of an image such that the sharp, edge-like features are reduced, and transitions from one color to another appear smooth. Resolution downscaling refers to the reduction of pixel resolution in an image. Noise refers to the random variation of brightness and color information in images. The noise applied to degrade an image can include, for example, additive white Gaussian noise, salt and pepper The degradation effects can be accomplished using one or more processes associated with each degradation effect.

In some implementations, the machine learning module 130 is integrated with the computer processors 160. However, the machine learning module 130 can be separate from the computer processors 160. The machine learning module 130 can perform a variety of machine learning processes, such as deep learning techniques (e.g., convolutional, radial basis function, recurrent, and/or modular neural network processing techniques) and/or Bayesian learning techniques. The machine learning module 130 applies machine learning techniques to train a machine learning model that, when applied to input data, generates indications of whether the input data items have associated property or properties, such as probabilities that the input data items have a particular Boolean property, or an estimated value of a scalar property.

As part of the training of the machine learning model, the machine learning module 130 forms a training set of input data by identifying a positive training set of input data items that have been determined to have the property in question, and, in some embodiments, forms a negative training set of input data items that lack the property in question. The machine learning module 130 extracts feature values from the input data of the training set, the features being variables deemed potentially relevant to whether or not the input data items have the associated property or properties. Specifically, the feature values extracted by the machine learning module can include pixel values, color, and/or texture. An ordered list of the features for the input data is herein referred to as the feature vector for the input data. In one embodiment, the machine learning module applies dimensionality reduction (e.g., via linear discriminant analysis (LDA), principle component analysis (PCA), or the like) to reduce the amount of data in the feature vectors for the input data to a smaller, more representative set of data.

The machine learning module 130 uses supervised machine learning to train the machine learning model, with the feature vectors of the positive training set and the negative training set serving as the inputs. Different machine learning techniques—such as linear support vector machine (linear SVM), boosting for other processes (e.g., AdaBoost), neural networks, logistic regression, naïve Bayes, memory-based learning, random forests, bagged trees, decision trees, boosted trees, or boosted stumps—may be used in different embodiments. The machine learning model, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning module 130 applies the trained machine learning model to the data of the validation set to quantify the accuracy of the machine learning model. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module 130 iteratively re-trains the machine learning model until the occurrence of a stopping condition, such as the accuracy measurement indication that the model is sufficiently accurate, or a number of training rounds having taken place.

The machine learning module 130 is configured to receive the degraded images 120, and for each degraded image 120, generates a predicted image 140. To generate the predicted images 140 from the degraded images 120, the machine learning module 130 uses a mapping function configured to reduce (or eliminate) the degradation effects added to the reference images 110 by the computer processors 160. The mapping function can be pre-programmed in the machine learning module 130, including weights and variables. The mapping function can also be generated by the machine learning module 130 by comparing one or more degraded images 120 with corresponding one or more reference images 110. Thus, the predicted images 140 can represent an attempt by the machine learning module 130 to restore the degraded images 120 to corresponding reference images 110.

In some implementations, the computer processors 160 and/or the machine learning module 130 are configured to determine a pixel loss value 151 by comparing each reference image 110 to a corresponding predicted image 140. In some implementations, the pixel values of several locations of each reference image 110 is compared with the pixel values of several locations of a corresponding predicted image 140. The determined pixel loss value can represent the difference between the pixel values of the several locations of the reference images 110 and the pixel values of the associated locations of the corresponding predicted images 140. For example, assume that a first reference image 110 is processed to generate a corresponding first degraded image 120, which is then processed to generate corresponding first predicted image 140. Although the machine learning module 130 attempts to restore the first degraded image 120 to the original first reference image 110, the resulting first predicted image 140 may not exactly match the original first reference image 110. The pixel values at several locations of the first predicted image 140 are compared with the pixel values of corresponding locations in the first reference image 110, and a pixel loss value 151 is determined based on the differences between the pixel values of the first predicted image 140 and the pixel values of the first reference image 110. In some implementations, the pixel loss value 151 can be determined by the following:

$$\text{Loss}_{Pixel} = \frac{1}{N} \sum_{i=0}^{n} \text{abs}(T_i - E_i) \qquad (1)$$

where T represents the pixel values of the reference images 110 and E represents the pixel values of the predicted images 140.

The computer processors 160 and/or the machine learning module 130 are configured to determine a HFL loss value 152 by comparing high-frequency information of the predicted images 140 with high-frequency information of corresponding reference images 110. For example, in some implementations, the computer processors 160 (or the machine learning module 130) generate a blurred image for each reference image 110 and each predicted image 140 by applying a Gaussian blur algorithm, having a standard deviation ($\sigma$), to the images. In some implementations, the blurred images only retain low-frequency information. In some implementations, other forms of degradations can also be used for generating images that retain low-frequency information.

For each reference image 110, the pixel values of the blurred image is subtracted from the corresponding pixel values of the original reference image to generate a corresponding high frequency image. Such pixel-wise difference is also calculated for each of the predicted images. For example, for each predicted image 140, the pixel values of the corresponding blurred image is subtracted from the original predicted image 140. The subtraction of the blurred images from the original images is defined as follows:

$$HF_I = I - G_\sigma(I) \qquad (2)$$

where $HF_I$ refers to a high-frequency image, I refers to the original image and $G_\sigma(I)$ refers to the low-frequency image. Thus, for every reference image 110, and for every predicted image 140, a corresponding high-frequency image can be generated. For each predicted image 140, the resulting high-frequency image is compared with the resulting high-frequency image of a corresponding reference image 110, and the differences (e.g., in terms of pixel values) are calculated to determine the HFL loss value 152. In some implementations, the HFL loss value 152 is defined as the average (across the N training images) of absolute pixel-wise differences between the high frequency images corresponding to the reference images and the high frequency images corresponding to the predicted images. This can be represented as:

$$\text{Loss}_{HFL} = \frac{1}{N} \sum_{i=0}^{n} \text{abs}(HF_{T_i} - HF_{E_i}) \qquad (3)$$

where $HF_T$ is the high-frequency image of the reference image 110 and $HF_E$ is the high-frequency image of the predicted image 140.

The computer processors 160 and/or the machine learning module 130 are configured to determine a total loss value 150. In some implementations, the total loss value is based on the HFL loss value 152. Alternatively or in addition to the HFL loss value 152, the total loss value is based on the pixel loss value 151. In some implementations, the total loss value 150 is defined as:

$$\text{Loss}_{total} = \text{LOSS}_{Pixel} + \alpha \text{Loss}_{HFL} \qquad (4)$$

In some implementations, $\alpha$ is equal to 1.0. However, a can be selected as any number based on tested and/or perceived biases.

In some implementations, the computer processors 160 and/or the machine learning module 130 compare the total loss value 150 with a threshold condition. For example, if the total loss value 150 represents an error value between the predicted images 140 and the reference images 110, the threshold condition can be a maximum error value. In some implementations, if the total loss value 150 is above the maximum error value (e.g., or other threshold condition), the computer processors 160 and/or the machine learning module 130 determines that the threshold condition is satisfied. The threshold conditions can be chosen based on accuracy and computing efficiency considerations.

In some implementations, the total loss value 150 is back-propagated through the machine learning module 130, where the machine learning module 130 updates its one or more mapping functions by adjusting one or more weights and/or variables in order to minimize the total loss value 150. Thus, the calculated total loss value can represent the error between the generated predicted images 140 and the reference images 110, and the machine learning module 130 can use this calculated error to adjust its one or more mapping functions such that it can learn to more accurately restore the degraded images 120 to the reference images 110. In some implementations, the total loss value 150 is back-propagated through the machine learning module 130 only if the total loss value 150 satisfies the threshold condition.

Figure 2:
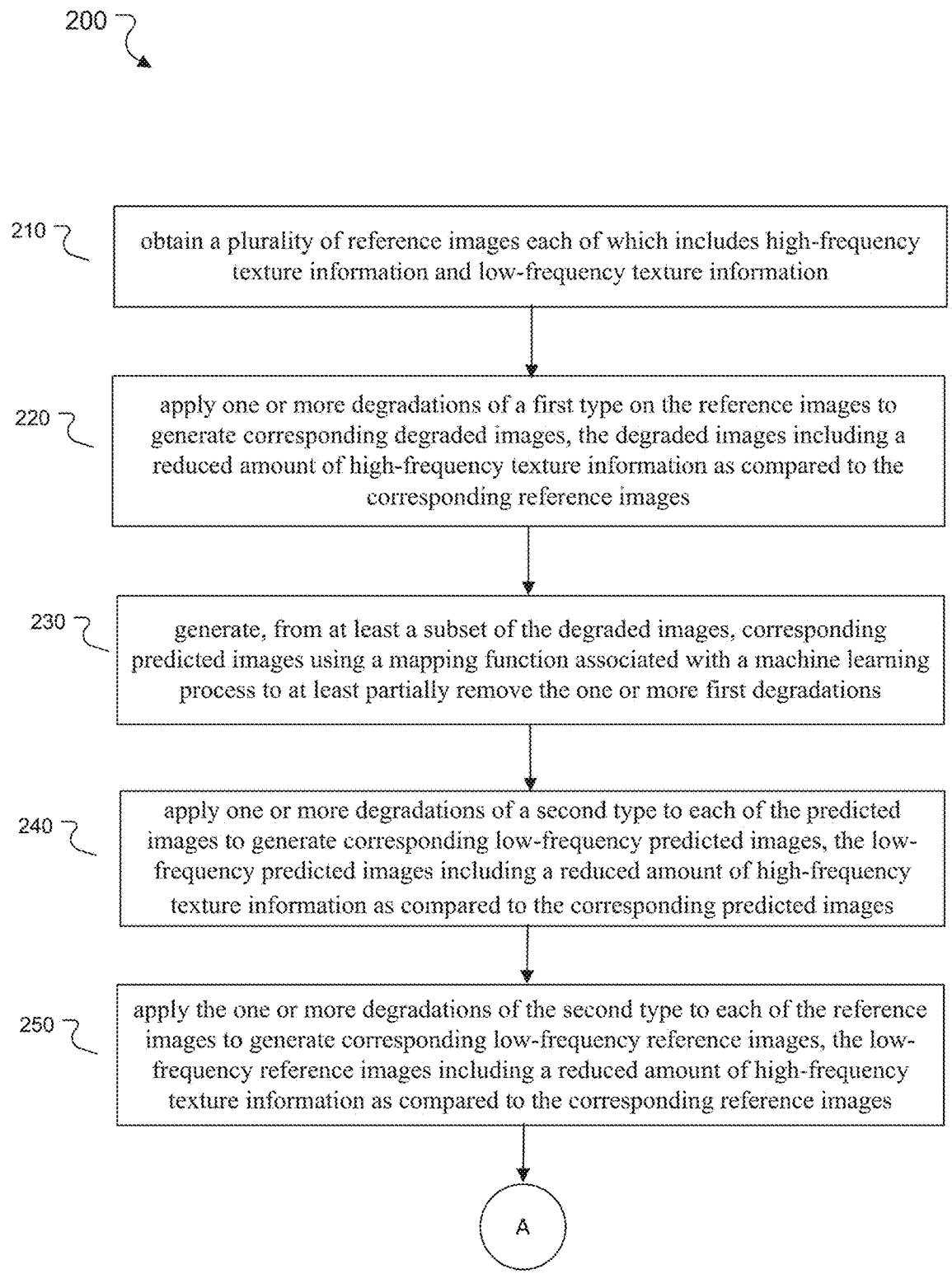
FIG. 2 is a flowchart depicting a process for training a machine-learning system that accounts for high frequency loss in generating super-resolution images.
Figure 2:
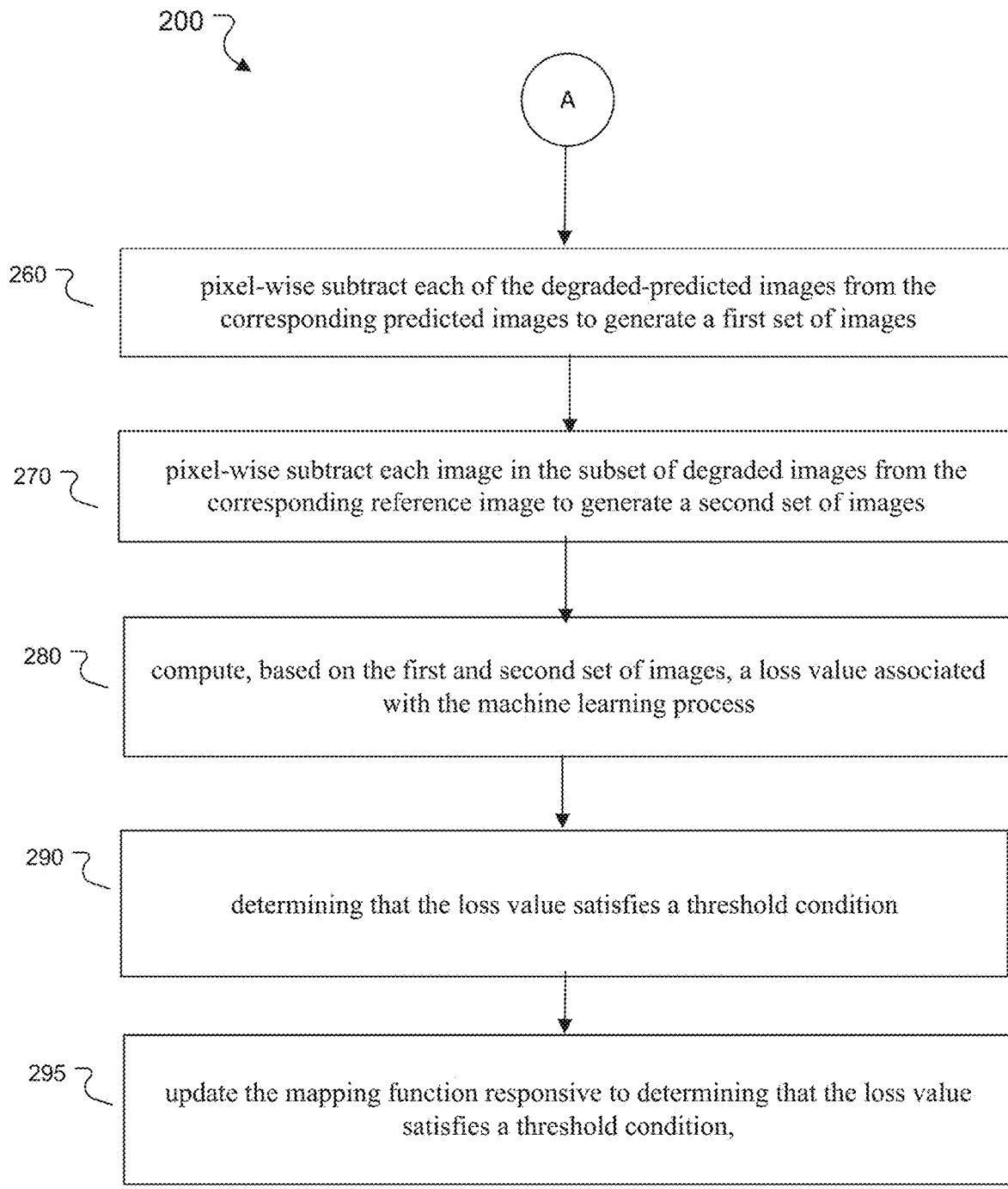

FIG. 2 is a flowchart depicting a process 200 for training a machine-learning system that accounts for high frequency loss in generating super-resolution images. In some implementations, the process 200 can be executed, at least in part in a portion of the architecture 100 shown above with reference to FIG. 1. For example, portions of the process 200 can be executed by the machine learning module 130 and/or the one or more computer processors 160 described above. Operations of the process 200 includes obtaining a plurality of reference images each of which includes high-frequency texture information and low-frequency texture information (210). The reference images can be a portion of training data used to train the machine-learning module 130. For example, the reference images can include high quality, high-resolution images that are usable by an underlying biometric authentication system for identification/verification of individuals. In some implementations, at least a portion of the reference images includes one or more ocular features usable for eye-print identification/verification.

Operations of the process 200 also includes applying one or more degradations of a first type on the reference images to generate corresponding degraded images, the degraded images including a reduced amount of high-frequency texture information as compared to the corresponding reference images (220). In some implementations, the one or more degradations of the first type includes a blur such that subjecting the reference images to the degradation removes at least portions of the high frequency texture information from the images. The added blur can be, for example, a Gaussian blur. Applying the one or more degradations of the first type can also include, for example, adding noise to the reference images, or downscaling the reference images to lower resolutions.

Operations of the process 200 also includes generating, from at least a subset of the degraded images, corresponding predicted images using a mapping function associated with a machine learning process to at least partially remove the one or more first degradations (230). In some implementations, the mapping function may be generated, for example, using a previous iteration of the learning process. In some implementations, generating the predicted images includes first generating the mapping function through a learning process using the reference and corresponding degraded images, and then generating the predicted images as a verification step associated with the learning. The mapping function can be a function that accepts a degraded image as an input and generates an output that at least partially restores the high-frequency texture information. In some implementations, the goal of the underlying learning process can be to recover, from the degraded images, images that closely approximate the corresponding reference images.

Operations of the process 200 further includes applying one or more degradations of a second type to each of the predicted images to generate corresponding low-frequency predicted images (240). The low-frequency predicted images thus can include a reduced amount of high-frequency texture information as compared to the corresponding predicted images. In some implementations, the degradations of the second type can be substantially similar to the degradations of the first type. For example, the same blur, resolution downscaling, or noise can be added to the predicted images to generate the degraded versions of the predicted images. The operations also include applying substantially the same degradations (as that applied to the predicted images) to the reference images to generate degraded (e.g., low-frequency) versions of the reference images (250). In some implementations, applying the degradations of the second type generates a blurred image for each reference image and each corresponding predicted image. In some implementations, where a Gaussian blur having a standard deviation ($\sigma$) is applied to am image, the corresponding degraded image can be represented as $G_\sigma(I)$.

Operations of the process 200 also includes pixel-wise subtracting each of the degraded-predicted images from the corresponding predicted images to generate a first set of images (260) and pixel-wise subtracting each of the low-frequency reference images from the corresponding reference image to generate a second set of images (270). In some implementations, (e.g., where the degradations of the first type are substantially similar to the degradations of the second type), the low-frequency reference images are substantially same as the corresponding degraded images generated in step 220. Subtracting the low frequency images from the corresponding original images can be done, for example, using equation 2, and yields high-frequency versions of the corresponding original images. For example, each of the first set of images and the second set of images can include high-frequency texture information from the corresponding original images.

Operations of the process 200 also includes computing a loss value associated with the machine learning process based on the first and second set of images (280). In some implementations, the loss includes a high-frequency loss computed via a pixel-wise subtraction between each image in the first set of images and a corresponding image in the second set of images. This can result in a set of pixel values (or a sum of pixel values) that represents a "loss" in high frequency information between the predicted images and the corresponding reference images. Because a purpose of the technology described herein is to minimize/reduce such high-frequency losses, a decision on whether additional training iterations are to be performed can be made based on a value of the loss. In this regard, operations of the process 200 can further include determining that the loss value satisfies a threshold condition (290), and in response, updating the mapping function (295). Updating the mapping function can include providing the machine learning module with additional training data such that the mapping function can be updated based on learning more features from such additional training data. The process 200 can then be repeated to determine if further iterations of training are needed. For example, if a determination is made that the loss value does not satisfy the threshold condition (e.g., the loss is less than an acceptable value, or is in an acceptable range), the training process can be terminated.

In some implementations, additional types of losses can be considered in conjunction with the high-frequency loss to determine whether additional iterations of training is needed. For example, computing the loss value can include computing a total loss as a sum of a pixel loss and the high-frequency loss. The pixel loss can be computed, for example, using equation (1) above. In some implementations, the pixel loss can be combined with the high-frequency loss in a weighted combination as shown, for example, in FIG. 1.

Figure 3:
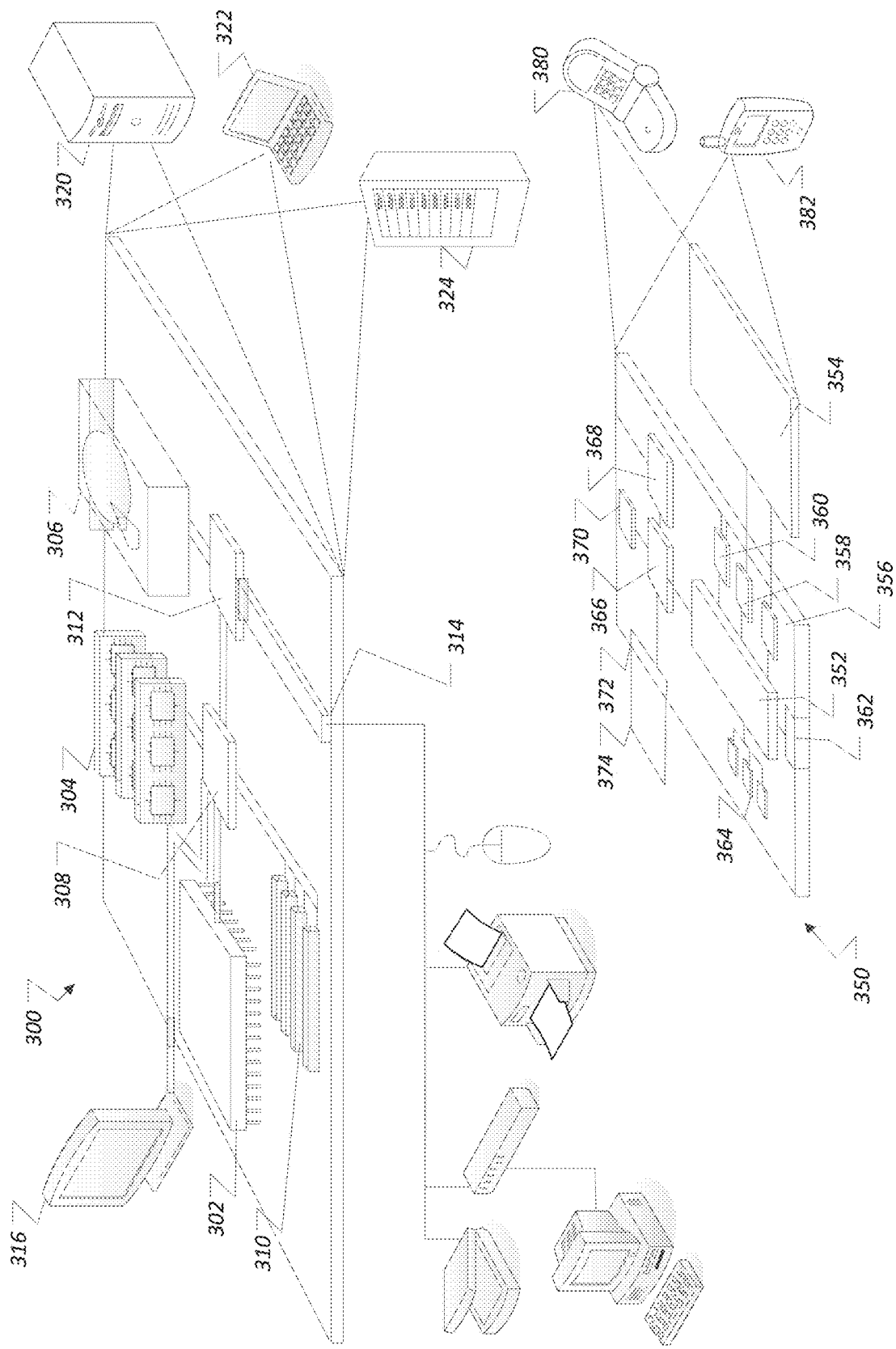
FIG. 3 are block diagrams of example computing devices that may be used in implementing a system in accordance with technology described herein.

FIG. 3 shows an example of a computing device 300 and a mobile device 350, which may be used with the techniques described here. For example, referring to FIG. 1, the device including the one or more computer processors can be embodied as one or more of the computing device 300 or the mobile device 350, either in part or in its entirety. The machine learning module 130 can also include at least a portion of the computing device 300 or a mobile device 350. The computing device 300 is intended to represent various forms of digital computers, such as laptops, desktops, workstations, personal digital assistants, servers, blade servers, mainframes, and other appropriate computers. The mobile device 350 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, memory on processor 352, or a propagated signal that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, and so forth) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method comprising:
obtaining a plurality of reference images each of which includes high-frequency texture information and low-frequency texture information;
applying one or more degradations of a first type on the reference images to generate corresponding degraded images, the degraded images including a reduced amount of high-frequency texture information as compared to the corresponding reference images;
generating, from at least a subset of the degraded images, corresponding predicted images using a mapping function associated with a machine learning process to at least partially remove the one or more degradations of the first type;
applying one or more degradations of a second type to each of the predicted images to generate corresponding low-frequency predicted images, the low-frequency predicted images including a reduced amount of high-frequency texture information as compared to the corresponding predicted images;
applying the one or more degradations of the second type to each of the reference images to generate corresponding low-frequency reference images, the low-frequency reference images including a reduced amount of high-frequency texture information as compared to the corresponding reference images;
pixel-wise subtracting each of the low-frequency predicted images from the corresponding predicted images to generate a first set of images;
pixel-wise subtracting each of the low-frequency reference images from the corresponding reference image to generate a second set of images;
computing, based on the first and second set of images, a loss value associated with the machine learning process;
determining that the loss value satisfies a threshold condition; and
responsive to determining that the loss value satisfies a threshold condition, updating the mapping function.

2. The method of claim 1, further comprising computing, based on the predicted images and corresponding reference images, a pixel-loss value associated with the machine learning process, and wherein computing the loss value associated with the machine learning process is also based on the pixel-loss value.

3. The method of claim 1, wherein the one or more degradations of the first type include at least one of noise, blur, or resolution downscaling.

4. The method of claim 1, wherein the one or more degradations of the second type includes a Gaussian blur.

5. The method of claim 1, wherein at least a portion of the plurality of reference images includes one or more ocular features.

6. The method of claim 1, wherein the mapping function is configured to restore high-frequency texture information.

7. The method of claim 1, wherein updating the mapping function includes adjusting one or more parameters of the mapping function to reduce the loss value.

8. The method of claim 1, wherein computing the loss value includes performing a pixel-wise subtraction between each image in the first set of images and a corresponding image in the second set of images.

9. The method of claim 1, wherein the first set of images and the second set of images include high-frequency texture information.

10. The method of claim 1, wherein a degradation of the first type is substantially same as a degradation of the second type.

11. A system, comprising:
a computer-readable memory comprising computer-executable instructions; and
at least one processor executing the computer executable instructions to provide a machine learning module, wherein training of the machine-learning module comprises:
obtaining a plurality of reference images each of which includes high-frequency texture information and low-frequency texture information;
applying one or more degradations of a first type on the reference images to generate corresponding degraded images, the degraded images including a reduced amount of high-frequency texture information as compared to the corresponding reference images;
generating, from at least a subset of the degraded images, corresponding predicted images using a mapping function associated with a machine learning process to at least partially remove the one or more degradations of the first type;
applying one or more degradations of a second type to each of the predicted images to generate corresponding low-frequency predicted images, the low-frequency predicted images including a reduced amount of high-frequency texture information as compared to the corresponding predicted images;
applying the one or more degradations of the second type to each of the reference images to generate corresponding low-frequency reference images, the low-frequency reference images including a reduced amount of high-frequency texture information as compared to the corresponding reference images;
pixel-wise subtracting each of the low-frequency predicted images from the corresponding predicted images to generate a first set of images;
pixel-wise subtracting each of the low-frequency reference images from the corresponding reference image to generate a second set of images;
computing, based on the first and second set of images, a loss value associated with the machine learning process;
determining that the loss value satisfies a threshold condition; and
responsive to determining that the loss value satisfies a threshold condition, updating the mapping function if the loss value satisfies a threshold condition.

12. The system of claim 11, wherein the machine learning module is configured to: compute, based on the predicted images and corresponding reference images, a pixel-loss value associated with the machine learning process, and wherein computing the loss value associated with the machine learning process is also based on the pixel-loss value.

13. The system of claim 11, wherein the one or more degradations of the first type include at least one of noise, blur, or resolution downscaling.

14. The system of claim 11, wherein the one or more degradations of the second type includes a Gaussian blur.

15. The system of claim 11, wherein at least a portion of the plurality of reference images includes one or more ocular features.

16. The system of claim 11, wherein the mapping function is configured to restore high-frequency texture information.

17. The system of claim 11, wherein updating the mapping function includes adjusting one or more parameters of the mapping function to reduce the total loss value.

18. The system of claim 11, wherein computing the loss value includes performing a pixel-wise subtraction between each image in the first set of images and a corresponding image in the second set of images.

19. The system of claim 11, wherein the first set of images and the second set of images include high-frequency texture information.

20. One or more non-transitory machine-readable storage devices encoded with instructions configured to cause one or more processing devices to execute operations comprising:

obtaining a plurality of reference images each of which includes high-frequency texture information and low-frequency texture information;

applying one or more degradations of a first type on the reference images to generate corresponding degraded images, the degraded images including a reduced amount of high-frequency texture information as compared to the corresponding reference images;

generating, from at least a subset of the degraded images, corresponding predicted images using a mapping function associated with a machine learning process to at least partially remove the one or more degradations of the first type;

applying one or more degradations of a second type to each of the predicted images to generate corresponding low-frequency predicted images, the low-frequency predicted images including a reduced amount of high-frequency texture information as compared to the corresponding predicted images;

applying the one or more degradations of the second type to each of the reference images to generate corresponding low-frequency reference images, the low-frequency reference images including a reduced amount of high-frequency texture information as compared to the corresponding reference images;

pixel-wise subtracting each of the low-frequency predicted images from the corresponding predicted images to generate a first set of images;

pixel-wise subtracting each of the low-frequency reference images from the corresponding reference image to generate a second set of images;

computing, based on the first and second set of images, a loss value associated with the machine learning process;

determining that the loss value satisfies a threshold condition; and responsive to determining that the loss value satisfies a threshold condition, updating the mapping function.

* * * * *